United States Patent
Tokuyo et al.

(10) Patent No.: US 6,894,676 B2
(45) Date of Patent: May 17, 2005

(54) DISPLAY DEVICE AND ITS DRIVING AND MANUFACTURING METHODS

(75) Inventors: Shino Tokuyo, Kawasaki (JP); Naoyuki Hayashi, Kawasaki (JP); Mitsuo Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 350 days.

(21) Appl. No.: 10/167,065

(22) Filed: Jun. 11, 2002

(65) Prior Publication Data

US 2002/0196216 A1 Dec. 26, 2002

(30) Foreign Application Priority Data

Jun. 12, 2001 (JP) ........................................ 2001-177338

(51) Int. Cl.⁷ ................................................ G09G 3/34
(52) U.S. Cl. ........................................ 345/107; 345/211
(58) Field of Search ................................ 345/107, 208, 345/210, 211, 212; 359/290, 296; 315/169.1

(56) References Cited

U.S. PATENT DOCUMENTS

| | | | |
|---|---|---|---|
| 4,126,854 A | 11/1978 | Sheridon | 340/373 |
| 4,143,103 A | 3/1979 | Sheridon | 264/4 |
| 4,261,653 A * | 4/1981 | Goodrich | 359/296 |
| 5,262,908 A | 11/1993 | Iwamatsu et al. | 360/77.12 |
| 5,604,027 A | 2/1997 | Sheridon | 428/323 |
| 5,717,515 A * | 2/1998 | Sheridon | 359/296 |
| 6,262,707 B1 * | 7/2001 | Sheridon | 345/111 |
| 6,407,763 B1 * | 6/2002 | Yamaguchi et al. | 347/112 |

FOREIGN PATENT DOCUMENTS

| | | |
|---|---|---|
| JP | 64-086116 | 3/1989 |
| JP | 8-234686 | 9/1996 |
| JP | 9-006277 | 1/1997 |
| JP | 9-185087 | 7/1997 |
| JP | 9-24639 | 9/1997 |
| JP | 11-085067 | 3/1999 |
| JP | 11-085069 | 3/1999 |
| JP | 11-161206 | 6/1999 |
| JP | 2000-275686 | 10/2000 |

* cited by examiner

*Primary Examiner*—Kent Chang
(74) *Attorney, Agent, or Firm*—Greer, Burns & Crain, Ltd.

(57) ABSTRACT

At least two regions having different colors and electrical characteristics are defined in a rotatable particle. The rotatable particle receives a rotation moment from an external electric field reaction. A base holds rotatably each rotatable particle. An electric field generating unit generates only during a certain electric field generating period an electric field in a spatial area where the rotatable particle is disposed. The intensity of the electric field is monotonously lowered during at least one third of the certain electric field generating period on a backward side of the period. It is possible to reduce a variation in a rotation operation and display a high quality image.

11 Claims, 6 Drawing Sheets

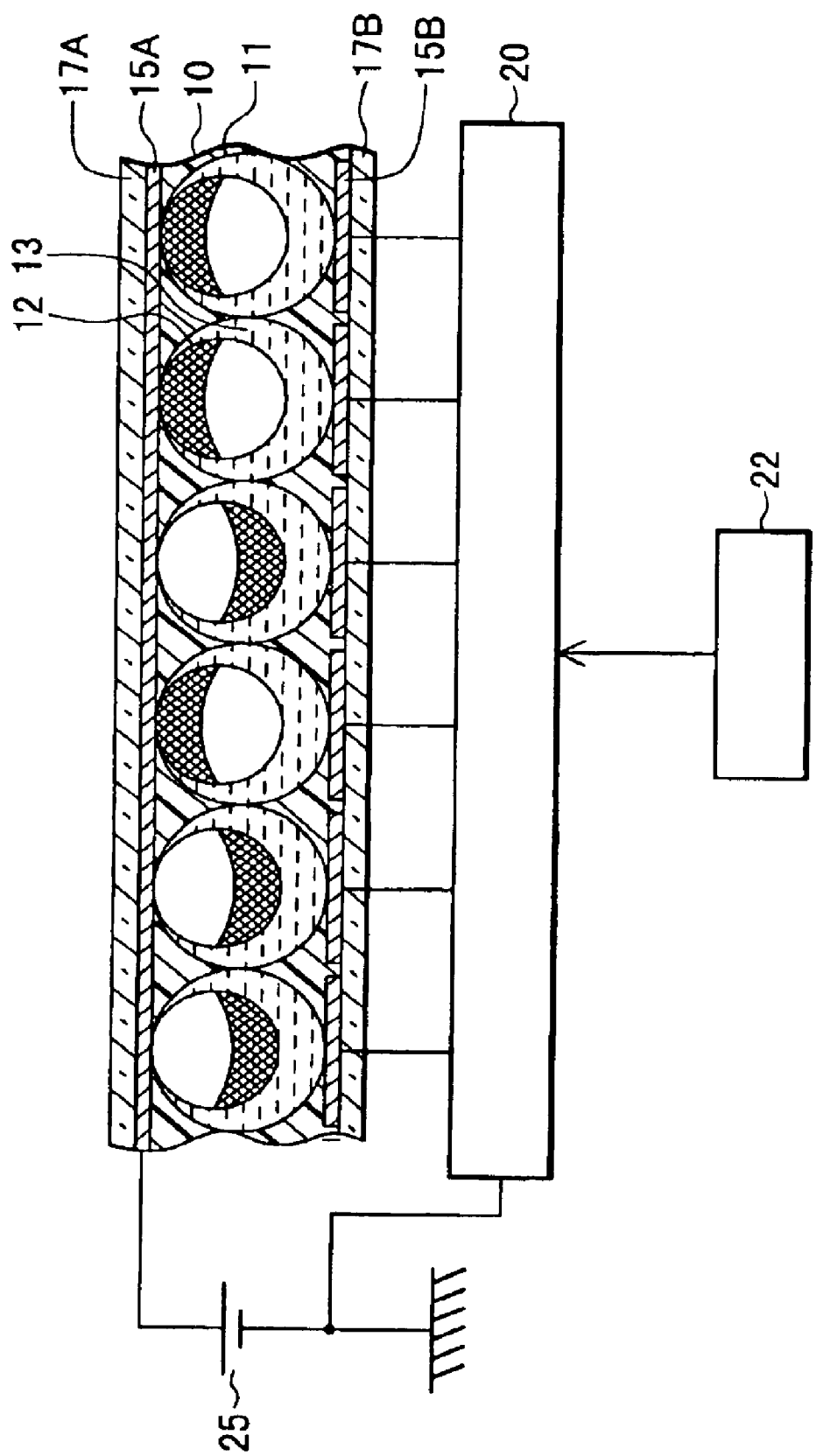

DISPLAY DEVICE AND ITS DRIVING AND MANUFACTURING METHODS

CROSS REFERENCE TO RELATED APPLICATION

This application is based on Japanese Patent Application No. 2001-177338, filed on Jun. 12, 2001, the entire contents of which are incorporated herein by reference.

BACKGROUND OF THE INVENTION

A) Field of the Invention

The present invention relates to a display device and its driving method, and more particularly to a display device for displaying an image by rotating rotatable particles disposed in a spatial area by applying an electric field and to its driving method, each rotatable particle having at least two surface regions having different colors and electrical characteristics.

B) Description of the Related Art

Sheet-like display media and devices have been proposed which are called electronic paper, paper-like display, digital paper or the like and which display an image by changing an optical absorption or reflection factor by applying an electric field. JP-A-1-86116 discloses a display device having microcapsules each accommodating colored solvent dispersed with electrophoretic particles. JP-A-8-234686 discloses a display device having microcapsules each accommodating a rotatable member of two semi spheres having different colors and electrical characteristics. A display device is also known having a liquid crystal-polymer composite film which contains dichroic pigment and semantic liquid crystal.

These display devices have a memory performance capable of holding image information without a power supply. Further, since a display layer can be formed on a PET film with electrodes, these display devices are expected to form a sheet-type display device which is thin, light and flexible.

A display medium described in the specifications of U.S. Pat. Nos. 4,126,854 and 4,143,103 has a contrast superior to other media. This display medium has rotatable particles each having two semi sphere regions having different colors and charging characteristics.

The operation principle of the display medium described in U.S. Pat. No. 4,126,854 will be described with reference to FIGS. 6A, 6B and 6C.

A plurality of voids 101 are formed in an optically transparent base material 100. A rotatable particle 103 is accommodated in each void 101 and translucent liquid 102 is filled therein. Two semi sphere regions having different colors and charging characteristics, e.g., white and black regions, are defined on the surface of each rotatable particle 103. The surface of the rotatable particle 103 is electrically charged by friction with the translucent liquid 102. The surface charge density of the white region is different from that of the black region.

Therefore, as an electric field is applied to the void 101, the rotatable particle 103 is transferred in electrophoresis and rotated. For example, FIG. 6A illustrates the state that the rotatable particle 103 sinks to the bottom of the void 101, with the white region being directed downward. As an electric field is applied, as shown in FIG. 6B the rotatable particle 103 floats and rises up while being rotated. Lastly, as shown in FIG. 6C the rotatable particle 103 rises to the top of the void 101, with the white region being directed upward.

When the display device in the state shown in FIG. 6A is looked at from the upper position in FIG. 6A, a black color can be visually recognized, and in the state shown in FIG. 6C, a white color can be visually recognized. In this manner, by rotatively moving the rotatable particle 103, the color can be switched between black and white.

Next, a conventional manufacture method for the rotatable particle 103 will be described. The specification of U.S. Pat. No. 5,262,908 discloses a method of coupling two types of melted wax particles having different colors, rounding them by a surface tension, and then solidifying them. The material of the rotatable particle is carnauba wax which contains carbon black, carnauba wax which contains titanium oxide, or the like.

A method of vapor-depositing or coating metal, carbon black, antimony or the like on the surface of a translucent particle is disclosed in JP-A-11-85067 and JP-A-9-246739. The material of the translucent particle is glass or resin.

JP-A-11-85069 discloses a method of manufacturing a rotatable particle by corona-charging the surface of a zinc oxide sphere, exposing the semi sphere region, and reverse-developing it with black toner. JP-A-11-161206 discloses a method of manufacturing a rotatable particle by exposing a partial surface of an opaque photosensitive particle which contains silver salt halide, coloring the exposed area by dipping it in developing liquid and fixing it.

A plurality of rotatable particles are rotatably held in a sheet and electrodes are formed on both sides of the sheet to form a display device. By applying a voltage across the electrodes, an electric field is applied to the inside of the sheet to rotatively move each rotatable particle.

As a d.c. voltage pulse is applied across the electrodes of a display device, there arises a variation in a rotation operation of each rotatable particle so that a clear image cannot be displayed.

SUMMARY OF THE INVENTION

An object of this invention is to provide a display device and its driving method capable of displaying a high quality image by suppressing a variation in a rotation operation.

According to one aspect of the present invention, there is provided a display device comprising: a plurality of rotatable particles each having at least two regions having different colors and electrical characteristics, the rotatable particle receiving a rotation moment from an external electric field; a base for rotatably holding each of said rotatable particles; and electric field generator for generating only during an electric field generating period an electric field in a spatial area where said rotatable particles are disposed, said electric field generator generating the electric field with its intensity being monotonously lowered during at least one third of the electric field generating period on a backward side of the period.

According to another aspect of the invention, there is provided a driving method for a display device having a plurality of rotatable particles each having at least two regions having different colors and electrical characteristics, the rotatable particle being rotatably held, receiving a rotation moment from an external electric field and rotatively moved and stopped at a desired position to display an image by generating only an electric field generating period an electric field in a spatial area where the rotatable particle is disposed, the driving method having a step of: displaying an image by generating the electric field with its intensity being monotonously lowered during at least one third of the electric field generating period on a backward side of the period.

It is possible to suppress an excessive rotation of the rotatable particle by monotonously lowering the intensity of an electric field.

According to a further aspect of the invention, there is provided a manufacture method for a display device, comprising: a step of preparing a plurality of particles each having at least two regions having different colors and electrical characteristics; and a step of mixing the plurality of particles with two-liquid room temperature hardening rubber, and heating the rubber and particles to change the particles to spheres and harden the rubber.

BRIEF DESCRIPTION OF THE DRAWINGS

FIG. 4 is a schematic cross sectional view of a display device according to a third embodiment of the invention.

DETAILED DESCRIPTION OF THE PREFERRED EMBODIMENTS

As a d.c. pulse voltage is applied across a pair of electrodes sandwiching a spatial area in which rotatable particles each defining two regions having different colors and charging characteristics are disposed (these rotatable particles are simply called dichroic rotatable particles in some cases), the rotatable particles rotatively move. Even if the voltage reaches 0 V, the rotation of the rotatable particle does not stop because of the moment of inertia of the rotatable particle. This phenomenon may be ascribed to a variation in the rotation operation (rotary angle) of the rotatable particle.

Figure 3A:
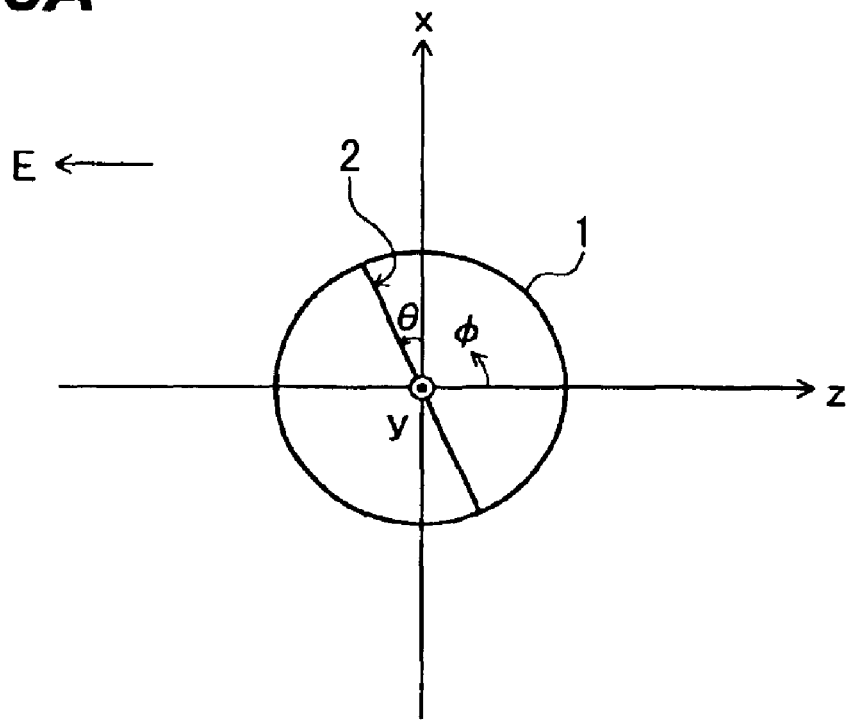
FIGS. 3A and 3B are diagrams illustrating the coordinate system applied to a rotatable particle and an electric field.
Figure 3B:
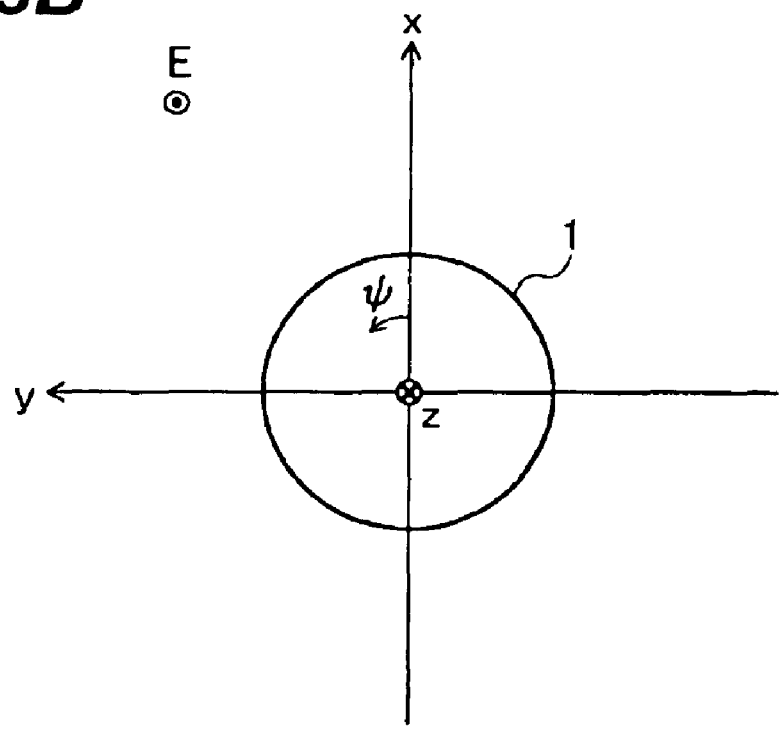

With reference to FIGS. 3A and 3B, the magnitude of a rotation moment applied to a dichroic rotatable particle will be described. As shown in FIG. 3A, consider the xyz rectangular coordinate system that the border 2 between two semispherical regions having different colors is parallel to the y-axis and the direction of an electric field E is the negative z-axis direction. A rotation moment M applied to a rotatable particle 1 is expressed by the following equation (1), by representing an inclination angle of the border 2 relative to the xy plane by θ, representing a polar angle relative to the positive z-axis direction by φ, and representing an azimuth angle relative to the positive x-axis direction by ψ:

$$M = \int_0^\pi \int_{\frac{\pi}{2}-\theta}^{\frac{\pi}{2}+\theta} E(R\sin\psi)^2 \sigma \sin\phi \, d\phi \, d\psi = \pi R^2 \sigma E \sin\theta \quad (1)$$

where E is a magnitude of an electric field, R is a radius of the rotatable particle, and σ is a difference of a surface charge density between two semispherical surfaces. It can be understood from this equation that the rotation moment M depends on the inclination angle of the border between two semispherical regions and changes like a sinusoidal function. When rotatable particles were rotatively moved by applying a voltage having a sinusoidal waveform to the display device, it was possible to eliminate an excessive rotation of particles and suppress a variation in display qualities. A first embodiment based upon these studies will be described.

Figure 1:
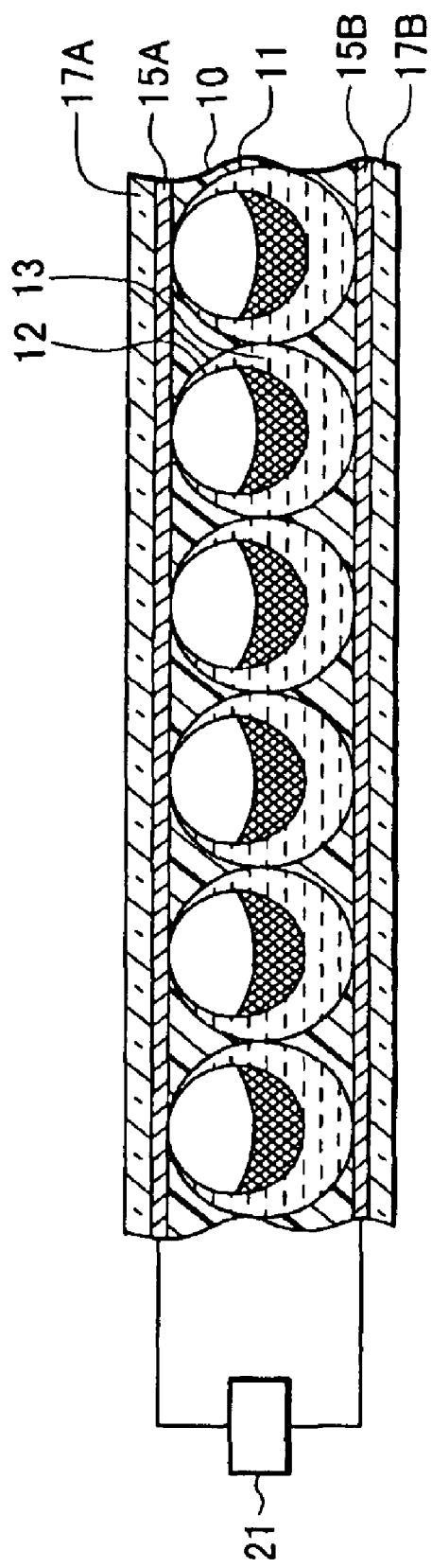
FIG. 1 is a schematic cross sectional view of a display device according to a first embodiment of the invention.

FIG. 1 is a schematic cross sectional view of a display device according to a first embodiment. There are plurality of voids 11 in a sheet base 10 of 300 μm in thickness. As the material of the sheet base 10 two-liquid RTV silicone rubber (KE109 manufactured by Shin-Etsu Chemical Co., Ltd.) which is solidified at a room temperature was used. A dichroic rotatable particle 12 is accommodated in each void 11 and transparent liquid 13 is filled therein. A polyester resin sphere colored black with carbon black and colored white with titanium oxide was used as the dichroic rotatable particle 12. The diameter of the dichroic rotatable particle 12 is 100±70 μm. The surface of the semispherical region containing carbon black has charging characteristics different from those of the surface of the semispherical region containing titanium oxide. Silicon oil (SH100, 20cS manufactured by Dow Coming Toray Silicone Co., Ltd.) was used as the transparent liquid 13.

A transparent film 17A is tightly attached to one surface of the sheet base 10, the transparent film having a transparent electrode 15A made of indium tin oxide (ITO). Similarly, a transparent film 17B is tightly attached to the other surface of the sheet base 10, the transparent film having a transparent electrode 15B made of ITO. The plane shape of the transparent electrodes 15A and 15B is a square having a side length of 2 cm. A power supply 21 sends a drive voltage to the electrodes 15A and 15B.

Next, a manufacture method for the display device of the first embodiment shown in FIG. 1 will be described. Elastomer such as silicon rubber before a bridging reaction and rotatable particles are mixed at a volume ratio of 1:1 to form a sheet. This sheet is placed in a vacuum environment to defoam it, and placed in an atmospheric environment for 48 hours at a room temperature to harden it.

The hardened sheet is immersed in silicon oil and maintained therein for 12 hours. Since silicon oil soaks into silicon rubber, the silicon rubber swells. The rotatable particle 12 is insoluble in silicon oil or hardly absorbs it. Therefore, the void 11 filled with silicon oil 13 is formed around the rotatable particle 12.

A display sheet having a similar structure may be manufactured by mechanically forming holes through a thermoplastic resin film, filling a rotatable particle and transparent liquid in each hole, and covering the thermoplastic resin film with another resin film.

Transparent films 17A and 17B with vapor-deposited ITO are tightly attached to both sides of the sheet. As an alternative of ITO, other transparent conductive materials such as $SnO_2$, $TiO_2$ and ZnO may also be used.

Next, a driving method for the display device of the first embodiment shown in FIG. 1 will be described. As a particle is immersed in liquid, charges are exchanged between the particle and liquid so that the particle is charged positive or negative. The black and white semispherical regions of the rotatable particle have different charging characteristics, one region being charged positive relative to the other region. In this embodiment, the black semispherical region is charged positive relative to the white semispherical region, and conversely the white semispherical region is charged negative relative to the black semispherical region.

An a.c. voltage at an amplitude of 100 V and a frequency of 5 Hz is applied across the transparent electrodes 15A and 15B. Thereafter, the frequency of the a.c voltage is raised to about 10 Hz. As the frequency is raised to 10 Hz. the rotative motion of the rotatable particle 12 cannot follow a change in the electric field, and the rotative motion stops. In this manner, the directions of a plurality of rotatable particles 12 can be aligned so that the black and white semispherical regions are perpendicular to the plane of the transparent film 17A. Magnetic material may be contained in the black semi sphere region to align the direction of the rotatable particle by a magnetic force.

Figure 2A:
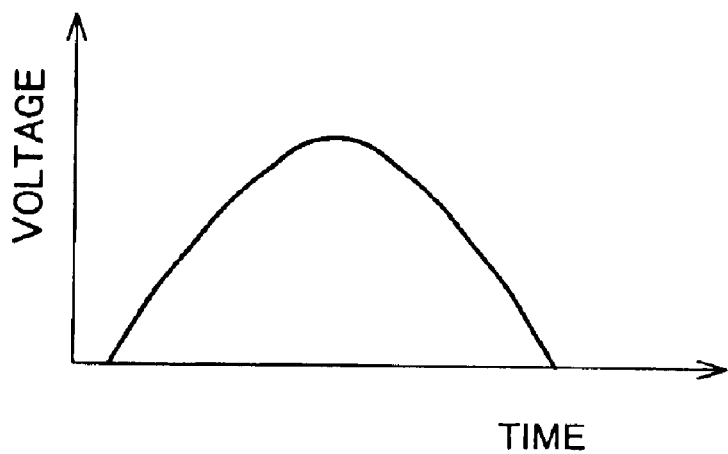
FIGS. 2A to 2C are graphs showing voltage waveforms used by a driving method for the display device of the first embodiment.

As shown in FIG. 2A, a portion from phase 0 to $\pi$ of an a.c. voltage having an amplitude of 100 V and a frequency of 1 Hz is applied across the transparent electrodes 15A and 15B. During the period while the voltage is applied, an electric field is generated in the spatial area where the rotatable particles 12 are disposed. The intensity of this electric field is proportional to the amplitude of the voltage applied across the transparent electrodes 15A and 15B. The rotatable particle 12 rotatively moves in such a manner that the black semispherical region charged positive relative to the white semispherical region is directed toward the negative electrode side. Either black or white can be displayed depending upon the polarity of the applied voltage.

The reflectivity factor of the display surface in a white display state was 24%, and that in a black display state was 1.5%. For the comparison sake, the reflectivity factor upon application of a rectangular voltage was measured. The reflectivity factors were 15% and 7% respectively for white and black display states. It can be seen that a high contrast is obtained by changing the amplitude of voltage like a sinusoidal function. A low contrast upon application of a rectangular voltage may be ascribed to the oblique direction of the front surface of the black or white semispherical region because of an excessive rotation of the rotatable particle 12. Through observation of the directions of optional ten rotatable particles, it was found that some particles rotated excessively. In contrast, upon application of the voltage having the waveform shown in FIG. 2A, rotatable particles having the black or white semispherical regions directed obliquely were hardly observed.

Suppression of an excessive rotation of the rotatable particle upon application of the voltage having the waveform shown in FIG. 2A may be ascribed to a monotonous reduction of the amplitude of voltage on the backward side of the period while the voltage is applied. In order to suppress an excessive rotation, the amplitude of voltage is monotonously lowered during one third of the period while the electric field is generated, on the backward side of the period. As seen from the equation (1), the rotation moment M applied to a rotatable particle depends upon the inclination angle a and changes like a sinusoidal function. It is therefore preferable to use the voltage waveform from phase $\pi/2$ to $\pi$ of the sinusoidal function during one third of the period while the electric field is generated, on the backward side of the period.

Next, a second embodiment of a display device with uniform diameters of rotatable particles will be described. The fundamental structure of a display device of the second embodiment is the same as that of the first embodiment shown in FIG. 1.

A manufacture method for rotatable particles used by the second embodiment will be described. Black and white fibers having a diameter of 50±10 $\mu$m are formed by using thermoplastic resin colored black with carbon black and thermoplastic resin colored white with titanium oxide. The black and white fibers are tightly coupled and subjected to a heat treatment to form one fiber whose one half cross section is black and whose other half cross section is white. This fiber is cut into dichroic cylindrical particles having a length of about 50 $\mu$m. This cylindrical particle is heated to form a sphere. With these processes, rotatable particles can be formed. The processes to follow are the same as those of the first embodiment. The diameters of rotatable particles manufactured by this method is 100±20 $\mu$m and a variation in the diameters is smaller than that of the first embodiment.

The display device of the second embodiment was driven by voltage having the waveform shown in FIG. 2A. The reflectivity factor in the white display state was 30% and that in the black display state was 1%. In contrast, the reflectivity factors were 18% and 3% respectively for white and black display states. Also in the second embodiment, a high contrast is obtained by using the drive voltage waveform like a sinusoidal function. Since the diameters of rotatable particles are uniform, a contrast higher than the first embodiment can be obtained.

In the second embodiment, although the cylindrical particles are changed to spheres and mixed with a sheet base, the following method may be adopted.

Cylindrical particles are mixed with two-liquid room temperature hardening rubber before hardening. The rubber before hardening is shaped to a sheet. The sheet is heated to change the cylindrical particle to a sphere and to harden the rubber. Two-liquid room temperature hardening rubber takes a relatively long time to be hardened. It is therefore possible to form a sphere before hardening.

Next, with reference to FIGS. 2B and 2C, other drive voltage waveforms will be described.

Figure 2B:
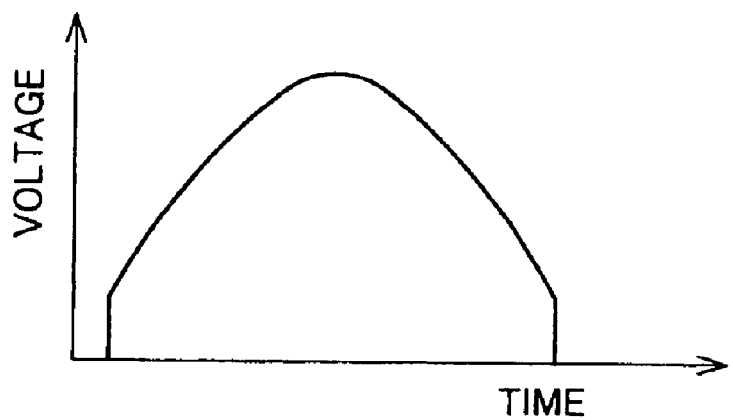

The drive voltage waveform shown in FIG. 2B has a d.c. bias superposed upon the waveform shown in FIG. 2A. A force necessary for starting the rotation of a rotatable particle 12 shown in FIG. 1 depends upon a viscous resistance of the transparent liquid 13 and is proportional to $R^2\eta$. R is a diameter of the rotatable particle 12 and $\eta$ is a viscous resistivity of the transparent liquid 13. If the viscous resistivity of the transparent liquid 13 is large, it is preferable to superpose a d.c. bias as shown in FIG. 2B.

Figure 2C:
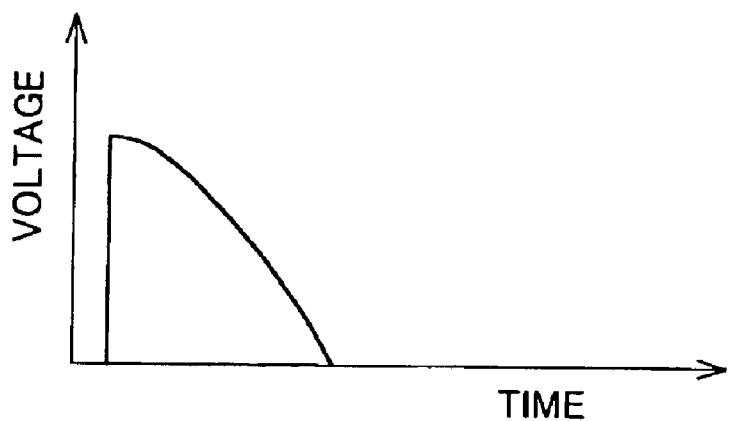

The drive voltage waveform shown in FIG. 2C is equal to the portion from phase $\pi/2$ to $\pi$ of a sinusoidal function. It is supposed that the voltage waveform shown in FIG. 2C is preferable if the border between two colors of the rotatable particle 12 shown in FIG. 1 is perpendicular to the display plane of the sheet base 10.

The material of the rotatable particle of the above-described embodiments may be resin such as polystyrene, polyacryl and polyethylene, glass and the like. It is preferable to use material which facilitates the control of a particle shape, coloring and charging characteristics. A specific gravity of material is also important from the viewpoint of motion control of a particle such as rotation and stop. It is also preferable that the material is chemically stable and substantially insoluble in transparent liquid around the rotatable particle, and has a small interaction with the transparent liquid. Such preferable material may be wax-like substance having a molecular weight of 50,000 or smaller and a specific gravity of 0.70 to 1.20.

The wax-like substance may be higher fatty acid, higher fatty acid metal salt, derivative of higher fatty acid, wax, olefin polymer or copolymer having a low molecular weight. Examples of higher fatty acid may be stearic acid, palmitin acid, myristic acid, lauric acid and the like. Examples of higher fatty acid metal salt may be aluminum stearate potassium stearate, zinc palmitate and the like. Derivatives of higher fatty acid may be Japan wax, beeswax, carnauba wax, microcrystalline wax, paraffin wax and the like.

Examples of olefin polymer or copolymer having a low molecular weight may be polyethylene, polypropylene, ethylene-vinyl acetate copolymer, ethylene-vinyl alkylether, and the like.

The display device of the embodiment shown in FIG. 1 displays the whole display plane in black or white. In order to display a desired image, it is necessary to form pixels by dividing one of the transparent electrodes into a plurality of pixel electrodes. In the third embodiment described below, pixels for forming an image are provided.

FIG. 4 is a cross sectional view of a display device of the third embodiment. The transparent electrode 15B shown in FIG. 1 is divided into a plurality of pixel electrodes. The diameter of the dichroic rotatable particle 12 is shorter than the size of one pixel. A d.c. power supply 25 applies a positive voltage to the transparent electrode 15A. In response to a control signal from a control circuit 22, a driver circuit 20 selectively applies a signal voltage to a particular electrode among a plurality of pixel electrodes 15B.

Figure 5A:
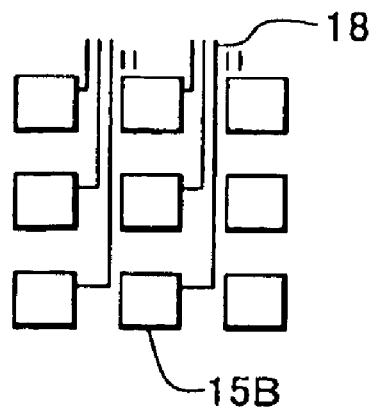
FIGS. 5A and 5B are plan views of pixel electrodes and a transparent electrode.
Figure 5B:
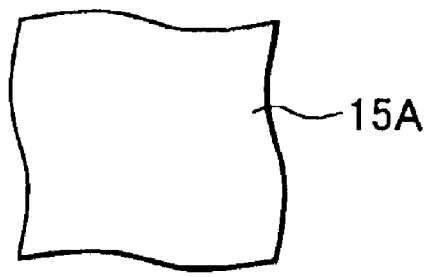
Figure 6A:
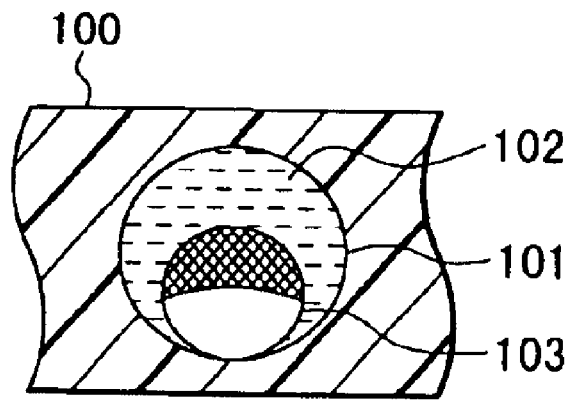
FIGS. 6A to 6C are cross sectional views of a rotatable particle and a void illustrating a rotation operation of a rotatable particle.
Figure 6B:
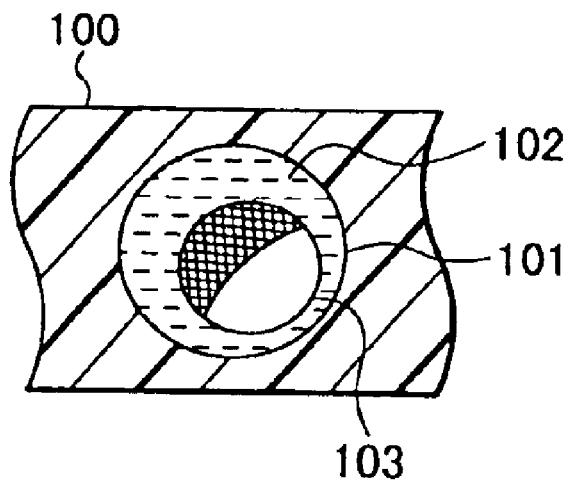
Figure 6C:
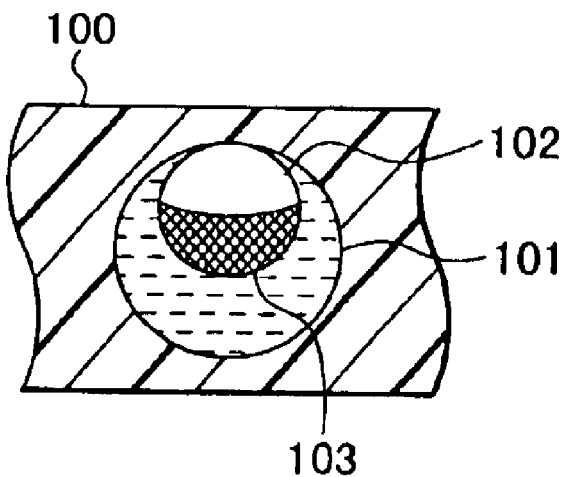

FIGS. 6A and 5B are plan views of the pixel electrodes 15B and the transparent electrode 15A. A plurality of pixel electrodes 15B are disposed in a matrix shape. A wiring lead 18 is connected to each pixel electrode 15B. The wiring lead 18 extends between pixel columns and reaches an external connection terminal disposed near at the edge of the display device. An image can be displayed by selectively applying a signal voltage to each of the plurality of pixel electrodes 15B via the wiring lead 18. The waveform of a signal voltage applied across each pixel electrode 15B and the opposing transparent electrode 15A is the same as one of those shown in FIGS. 2A to 2C used by the display device driving methods of the above-described embodiments.

Figure 5C:
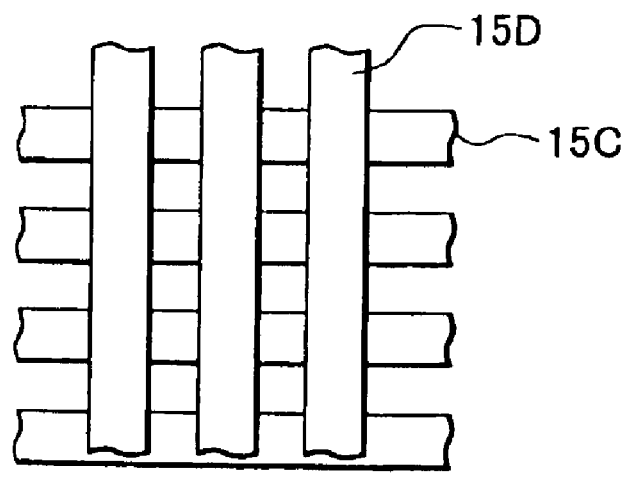
FIG. 5C is a plan view showing another example of transparent electrodes.

FIG. 5C shows another example of the structure of transparent electrodes. A plurality of transparent straight electrodes 15C are disposed along the column direction, whereas a plurality of transparent straight electrodes 15D are disposed along the row direction. As a voltage is applied between particular electrodes 15C and 15D, an electric field can be generated at their cross point The present invention has been described in connection with the preferred embodiments. The invention is not limited only to the above embodiments. It is apparent that various modifications, improvements, combinations, and the like can be made by those skilled in the art.

What we claim are:

1. A display device comprising:
   a plurality of rotatable particles each having at least two regions having different colors and electrical characteristics, the rotatable particle receiving a rotation moment from an external electric field;
   a base for rotatably holding each of said rotatable particles; and
   electric field generator for generating only during an electric field generating period an electric field in a spatial area where said rotatable particles are disposed, said electric field generator generating the electric field with its intensity being monotonously lowered during at least one third of the electric field generating period on a backward side of the period.

2. A display device according to claim 1, wherein said electric field generator includes electrodes to be used for generating the electric field and a power supply for applying a voltage across the electrodes.

3. A display device according to claim 2, wherein of a waveform of the voltage applied from the power supply, the waveform of the voltage during in one third of the electric field generating period on the backside of the period is equal to a portion of a waveform of a sinusoidal function from phase $\pi/2$ to $\pi$.

4. A display device according to claim 3, wherein an end point of the electric field generating period corresponds to phase it of the sinusoidal function.

5. A display device according to claim 3, wherein a d.c. bias voltage is superposed upon the voltage applied by the power supply.

6. A display device according to claim 4, wherein a d.c. bias voltage is superposed upon the voltage applied by the power supply.

7. A display device according to claim 2, wherein a waveform of the voltage applied by the power supply is a waveform of a sinusoidal function from phase 0 to $\pi$.

8. A driving method for a display device having a plurality of rotatable particles each having at least two regions having different colors and electrical characteristics, the rotatable particle being rotatably held, receiving a rotation moment from an external electric field and rotatively moved and stopped at a desired position to display an image by generating only an electric field generating period an electric field in a spatial area where the rotatable particle is disposed, the driving method having a step of:
   displaying an image by generating the electric field with its intensity being monotonously lowered during at least one third of the electric field generating period on a backward side of the period.

9. A driving method for a display device according to claim 8, wherein said image displaying step applies voltage across electrodes to generate the electric field, and the voltage has a waveform during in one third of the electric field generating period on the backside of the period being equal to a portion of a waveform of a sinusoidal function from phase $\pi/2$ to $\pi$.

10. A driving method for a display device according to claim 8, further comprising before said image displaying step a step of generating the electric field to rotatively move the rotatable particles to arrange vectors, in a same direction, of said rotatable particles from a center of one of the two regions having different colored surfaces to a center of the other.

11. A driving method for a display device according to claim 9, further comprising before said image displaying step a step of generating the electric field to rotatively move the rotatable particles to arrange vectors, in a same direction, of said rotatable particles from a center of one of the two regions having different colored surfaces to a center of the other.

* * * * *

UNITED STATES PATENT AND TRADEMARK OFFICE
CERTIFICATE OF CORRECTION

PATENT NO. : 6,894,676 B2
DATED : May 17, 2005
INVENTOR(S) : Tokuyo et al.

It is certified that error appears in the above-identified patent and that said Letters Patent is hereby corrected as shown below:

Column 8,
Line 14, delete "it" and insert -- $\pi$ --.

Signed and Sealed this

Twenty-seventh Day of September, 2005

JON W. DUDAS
*Director of the United States Patent and Trademark Office*